Aug. 6, 1968  HARUO TESHI ET AL  3,395,965
SMALL-SIZED CINEMATOGRAPHIC CAMERA DEVICE
Filed July 21, 1965  6 Sheets-Sheet 1

Haruo Teshi and
Famio Sasaki,
Inventors

Haruo Teshi and
Fumio Sakaki,
Inventor

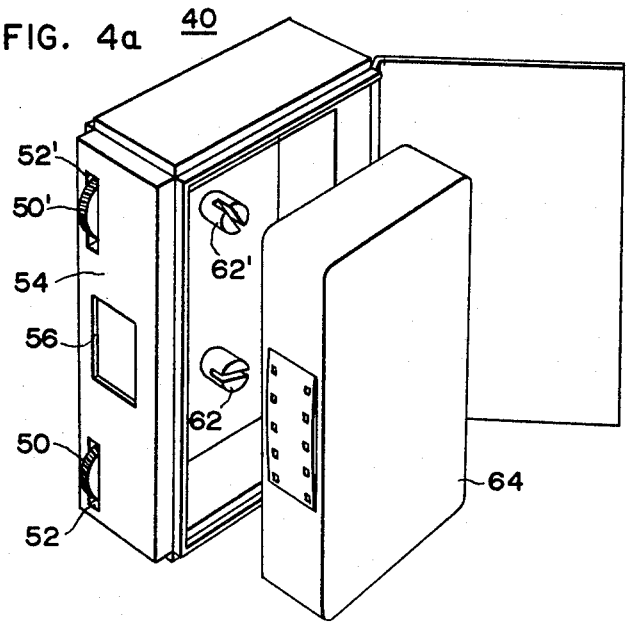
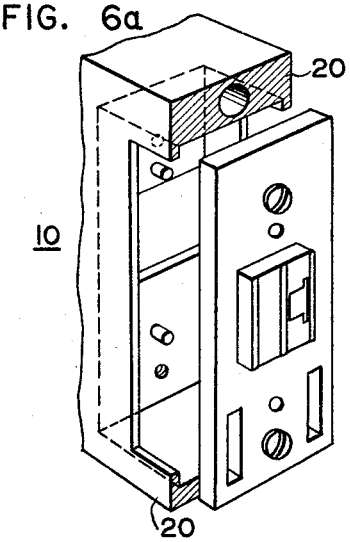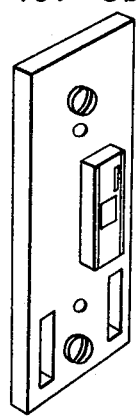

United States Patent Office 3,395,965
Patented Aug. 6, 1968

3,395,965
SMALL-SIZED CINEMATOGRAPHIC
CAMERA DEVICE
Haruo Teshi and Fumio Sakaki, Nagoya, Japan, assignors to Elmo Company Limited, Mizuho-ku, Nagoya, Japan
Filed July 21, 1965, Ser. No. 473,707
Claims priority, application Japan, July 27, 1964, 39/42,076
2 Claims. (Cl. 352—221)

ABSTRACT OF THE DISCLOSURE

A camera in which the main body is provided with a plurality of interchangeable aperture plates, one for each of interchangeable film magazines, different in configuration and outside dimension from one another, and magazines for loading cinefilms different in frame size and available form are provided with the corresponding openings for engagement with the associated aperture plates. For cinefilm having different positions of perforations relative to a frame, an intermittent feed mechanism within the main camera body includes a plurality of feed claws and a plurality of cams for them and the main camera body is provided on the rear wall with one hole associated with each claw while each magazine is provided on the front wall with the projection. With one magazine connected to the main camera body, the projection on that magazine is inserted into one hole determined by the position of perforations relative to a frame on the cinefilm involved, and brings the feed claw associated with that hole into its operative position.

---

This invention relates to a small-sized cinematographic camera device capable of selectively using lengths of cinefilm different in both frame size and available form.

There have been heretofore known small-sized cinematographic camera devices of the type comprising a main body including a photographic objective, a driving mechanism etc. and a single film loading unit detachably connected to the main body and adapted to have loaded therein a length of double width 8 mm. cinefilm alone. For example, U.S. Patent No. 3,017,803 issued on Jan. 23, 1962, discloses and claims such a type of small-sized cinematographic camera device.

As well known, the double width 8 mm. cinefilm includes a pair of exposure zones longitudinally juxtaposed to each other. One of the exposure zones can first travel in one direction to be exposed to a scene or scenes to be photographed and thereafter the other exposure zone travels in the opposite direction for exposure purposes. Recently the single width type of 8 mm. cinefilm somewhat different in frame size from the double width type has become available and increasingly demanded. In addition, these types of 8 mm. cinefilm are available in the form of a roll or a cartridge in which a length of such a cinefilm is loaded.

On the other hand, there lately is a tendency to employ photographic objectives of "Zoom" type high in both relative aperture and "Zoom" ratio, automatic exposure mechanisms, power operated zooming mechanisms, bright view finders with high magnification etc. This tends to inevitably increase the degree of accuracy in producing camera components and also the number of the components.

Under these circumstances, in order to selectively use the lengths of 8 mm. cinefilm different in both frame size and available form it is very desirable to provide a small-sized cinematographic camera device comprising a single main body including a photographic objective, various driving mechanisms with a high degree of manufacturing accuracy and a plurality of film loading units of relatively simple construction adapted to be selectively connected to the main body and to load therein predetermined lengths of 8 mm. cinefilm such as above described respectively.

Accordingly it is a principal object of the invention to provide an improved small-sized cinematographic camera device comprising a single main body including a photographic objective and various necessary mechanisms of complicated construction such as an exposure mechanism, a mechanism for intermittently feeding a length of cinefilm, a drive etc. and a plurality of simple, cheap film loading units each forming a part of the camera device and including only the minimum number of the necessary mechanisms such as a taking-up mechanism and a footage meter whereby any desired one of a plurality of cinefilms, different in both frame size and available form, such as the double or single width type of 8 mm. cinefilm can be selectively used.

It is another object of the invention to provide an improved small-sized cinematographic camera device of the type described in the preceding paragraph in which a plurality of film loading units can be selectively coupled to the single main body in an extremely simple and reliable manner.

It is a further object of the invention to provide an improved small-sized cinematographic camera device of the type described for the principal object thereof in which, upon coupling a selected one of the film loading units to the single main body, an aperture plate provided on the side of main body is manually or automatically set to its dimension suitable for the frame size and available form of the associated length of 8 mm. cinefilm loaded in the selected film loading unit.

With the above cited objects in view, the invention resides in a small-sized cinematographic camera device comprising a single main body including the essential mechanisms for operating the device and a plurality of film loading units capable of being detachably connected to the single main body and including a film taking-up mechanism characterized in that a plurality of aperture plates different in dimension are selectively associated with the single main body in accordance with the frame size and available form of a cinefilm involved, and the selected aperture plate attached on that surface of the single main body coupled to the associated film loading unit projecting outwardly beyond the abovementioned surface, and the film loading units have the respective openings into which only the selected ones of the aperture plates are fitted respectively.

Preferably a plurality of aperture plates may be selectively and detachably connected to the single main body in accordance with the frame size and available form of a cinefilm involved.

Conveniently, a single aperture plate variable in dimension may be mounted on that surface of the single main body coupled to the associated film loading unit so as to project outwardly beyond the abovementioned surface. The single aperture plate may preferably include a central stationary portion and a pair of movable portions abutting vertically or laterally against the central portion. The pair of movable portions are arranged to occupy either their operative positions where they are flush with the central portion or their inoperative positions where they are retracted toward the interior of the main body in accordance with a film opening of a film cartridge loaded into the associated film loading unit.

The invention as to its organization and the method of operation thereof as well as other objects and advantages thereof will become more readily apparent from the following detailed description taken in conjunction with the accompanying drawings in which:

FIG. 3b is an elevational view, partly in longitudinal section of the film loading unit illustrated in FIG. 3a;

FIG. 4a is a view similar to FIG. 3a but illustrating a film cartridge including therein a pressure plate and a length of cinefilm, separated from the film loading unit;

FIG. 4b is a longitudinal sectional view of the film loading unit having loaded therein the cartridge illustrated in FIG. 4a;

Figure 7A:
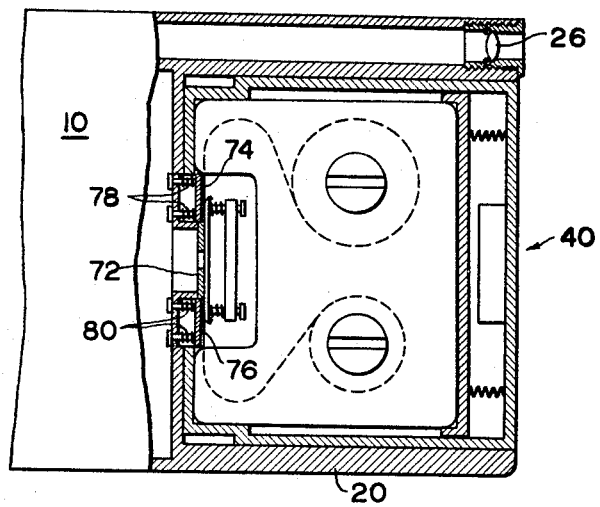
Figure 7B:
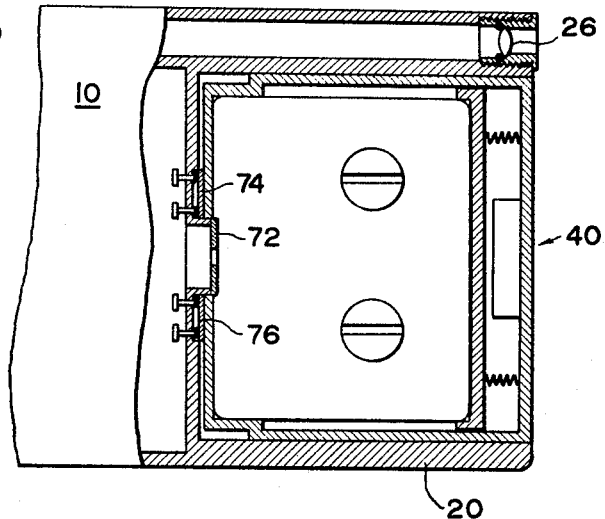
Figure 8A:
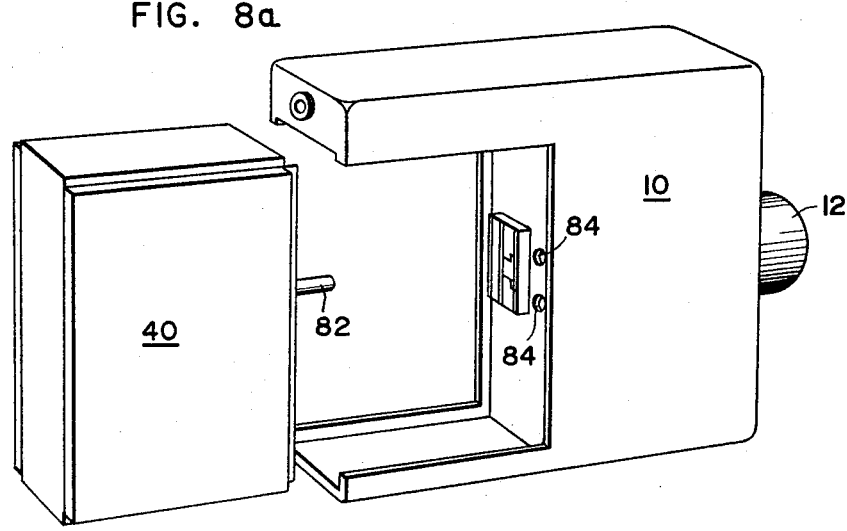
Figure 8B:
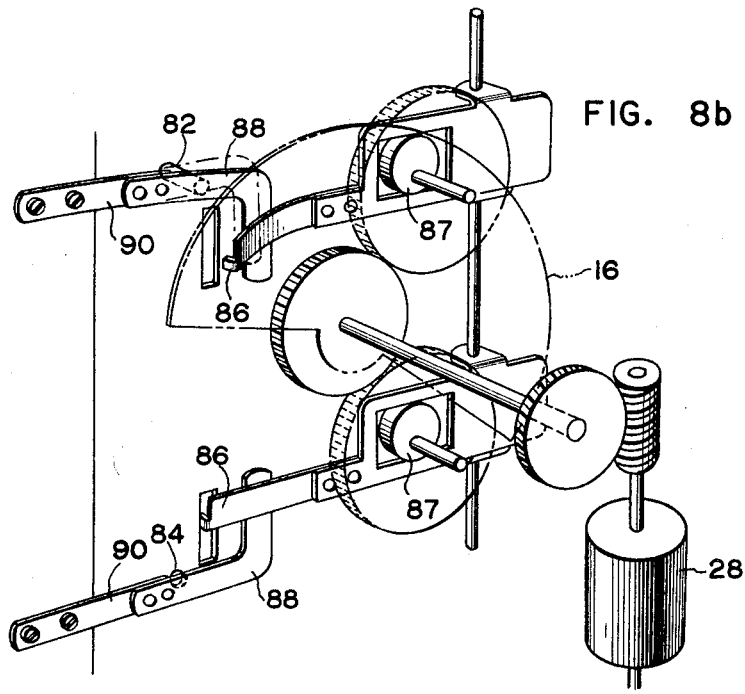

FIGS. 6a and b are perspective views of aperture plates for use with the single and double width types of cinefilm respectively;

FIG. 7 is a fragmental longitudinal sectional view of a modification of the invention suitable for use with a cartridge type cinefilm;

FIG. 8a is an exploded fragmental perspective view of another modification of the invention including a mechanism for selecting a plurality of intermittent feed claws dependent upon the position of perforations relative to the frame on a cinefilm involved; and FIG. 8b is a diagrammatic perspective view illustrating the operation of the mechanism for selecting the intermittent feed claws.

8 mm. cinefilms available in a cartridge in which a length of cinefilm is loaded can be sorted into the following three types:

(1) Both an aperture plate and a pressure plate are disposed on the side of the cartridge;

(2) Only a pressure plate is disposed on the side of the cartridge while an aperture plate is provided on the main body of the camera device; and (3) Both an aperture plate and a pressure plate are disposed on the side of the main body of the camera rather than the side of the cartridge.

The type (1) of cartridges is inherently disadvantageous because of the errors inevitably resulting from mechanical working of those portions of a cartridge and a main body of a camera device coupled to each other. Inclusion of any foreign matter in such coupling parts and the like greatly affect the position of the resulting image plane. Therefore, the types (2) and (3) of cartridges are considered as the subject of the invention.

According to the teachings of the invention, an aperture plate is provided on a camera operating unit which forms the essential part of a cinematographic camera device while a pressure plate is provided on a film loading unit when the associated film cartridge includes no pressure plate. When the associated film cartridge is provided with a pressure plate the same pressure plate is utilized.

On the other hand, where, in order to selectively se lengths of cinefilm different in frame size, the amount of film fed per unit, position of perforations relative to the frames on the film, dimensions of the picture gate or aperture and film alignment should vary, and a plurality of aperture plates different in dimension may selectively utilized in accordance with the type of cinefilm involved. Thus a selected one of the aperture plates can be attached to the main body of the camera device in accordance with the type of cinefilm to be used at that time. Alternatively a single aperture plate variable in dimension may be disposed on the main body as will be described in detail hereinafter. In addition, a plurality of intermittent feed claws and associated cam members to feed different amounts of film per unit time and having different positions of film perforations relative to the frames may be provided on the side of the main camera body to be selectively used in accordance with the type of the cinefilm to be used at that time.

Figure 1:
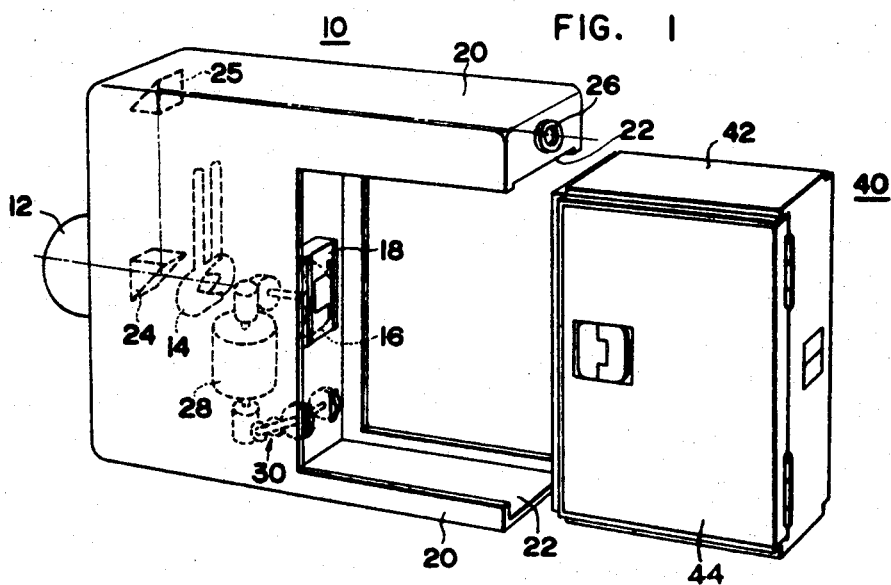
FIG. 1 is an exploded perspective view of a small-sized cinematographic camera device constructed in accordance with the teachings of the invention.
Figure 3A:
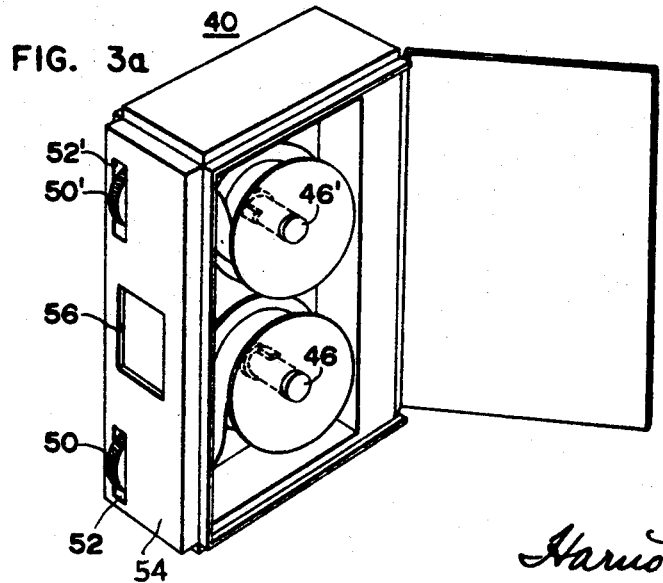
FIG. 3a is a perspective view of a film loading unit constructed in accordance with the teachings of the invention and having loaded therein a length of cinefilm of roll type with the cover open for the purpose of clarifying the internal construction.

Referring now to FIGS. 1 and 2, there is illustrated a small-sized cinematographic camera device constructed in accordance with the teachings of the invention. An arrangement illustrated comprises a main body 10 including a photographic objective 12 at the front face, a diaphragm 14, a shutter 16 and an aperture plate 18 successively disposed in the named order and aligned with the optical axis of the objective 12. The aperture plate 18 is detachably disposed at the recessed rear end face of the main body 10 so as to project beyond that rear end face. The main body 10 has a pair of rearward extensions 20 on the upper and lower sides as viewed in FIG. 1 having preferably a pair of shallow grooves 22 for a purpose as will be apparent hereinafter.

The main body 10 includes a view finder system consisting of a deflecting prism 24 disposed between the objective 12 and the diaphragm 14, another deflecting prism 25 disposed above the first prism 24 and an eyepiece 26 mounted at the rear end of the upper extension 20. The components 12–16 and 24–26 except for the aperture plate 18 are of the conventional construction and need not be further described.

Further the main body 10 includes driving means such as an electric motor 28, a train of gears generally designated by the reference numeral 30 and operatively coupled to the motor 28, and a mechanism for intermittently feeding a length of cinefilm of the conventional construction.

The main body 10 also includes a source of electric power for energizing the motor 28, a start and a termination pushbutton, a control mechanism for controlling a frame speed and other mechanisms necessary for operating the camera device in the conventional manner although those components are not illustrated in the drawings.

A film loading unit generally designated by the reference numeral 40 is adapted to be snugly fitted into a recessed rear portion of the main body 10 defined by the upper and lower extensions 20 on the latter. To this end, the film loading unit 40 substantially corresponds in dimension to the abovementioned recessed rear portion and is preferably provided on the upper and lower side faces with a pair of ridges 42 complementary in configuration to the grooves 22 formed on the opposed inner faces of the rear extensions 20. As shown in FIG. 1, the film loading unit has one lateral side adapted to be closed with a cover plate 44.

Figure 2A:
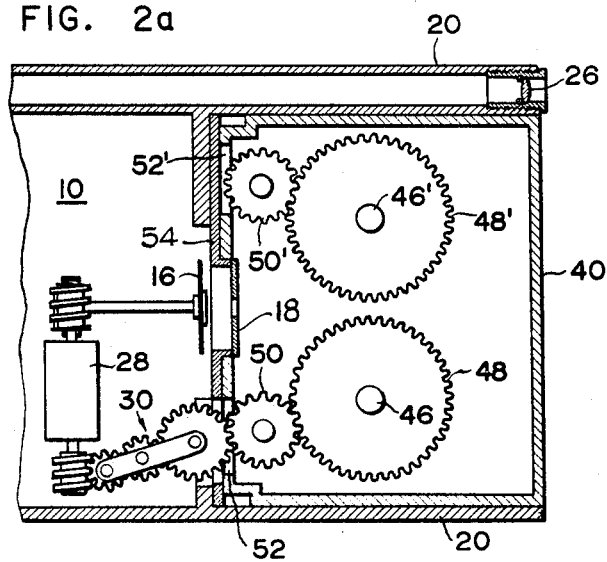
FIG. 2a is a fragmental longitudinal sectional view of the camera device illustrated in FIG. 1 and illustrating the manner in which motive power is transmitted from the main body of the camera device to a film loading unit associated to the latter.
Figure 2B:
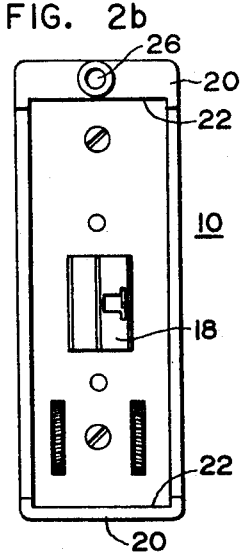
FIG. 2b is a rear end view of the main body of the camera device illustrated in FIGS. 1 and 2a with the film loading unit removed.

In order for the film loading unit 40 to be permitted to load a length of double width 8 mm. cinefilm in the form of a roll, the same is designed and constructed such that it can be coupled upside down to the main body 10. Further, as shown in FIG. 2a, the film loading unit 40 includes rotatably mounted therein a pair of spaced spool shafts 46 and 46' on each of which a taking-up or a supply spool (not shown in FIG. 2a) is mounted respectively. Each shaft 46 and 46' has rigidly secured at one end a spur gear 48 and 48' meshing with a pinion 50 and 50' which, in turn, partially projects into an opening 52 and 52' formed on the front surface 54 of the loading unit on which the latter is capable of being operatively coupled to the main body 10.

As best shown in FIG. 2a, the gear train 30 disposed on the side of the main body 10 has its last gear slightly projecting beyond the adjacent portion of the rear wall of the main body and disposed in its position where the last gear is adapted to mesh with the pinion 50 or 50' as the case may be, in the film loading unit as coupled to the main body. With the film loading unit 40 in its position illustrated in FIG. 2a it will be appreciated that a driving power from the motor 28 is transmitted to the taking-up shaft 46 through the gear train 30, the pinion 50 and the gear 48.

If the film loading unit 40 is coupled upside down to the main body 10, that is, in its position inverted from that shown in FIG. 2a, the shaft 46' serves as the taking-up shaft and the pinion 50' must be operatively coupled to the gear train 30. In this case, however, the pinion 50' is positioned adjacent that side of the front surface 54 of the loading unit 40 opposite to the side thereof on which the pinion 50 is positioned when the unit is in its normal position as shown in FIG. 2a. Therefore, the gear train includes another last gear coaxial with the abovementioned last gear and adapted to mesh with the pinion 50' (see FIGS. 1 and 2b). With the film loading unit in its inverted position, the motor 28 will drive the taking-up shaft 46' through the gear train involving said another last gear, the pinion 50' and the gear 48'.

As shown in FIGS. 2a and 3, the film loading unit 40 is provided on the front surface 54 with an opening 56 into which the projecting aperture plate 18 disposed on the side of the main body 10 is adapted to be snugly fitted in its operating position. A pressure plate 58 is resiliently disposed in opposed relationship to the opening 56 and on the internal surface of the front wall 54 of the film loading unit 40 in the conventional manner. A length of cinefilm available in the form of a roll and mounted on the supply shaft 46' passes along a path 60 (see FIG. 3b) involving a pair of upper and lower film loops and a slit formed between the aperture and pressure plates 18 and 58.

Figure 4B:
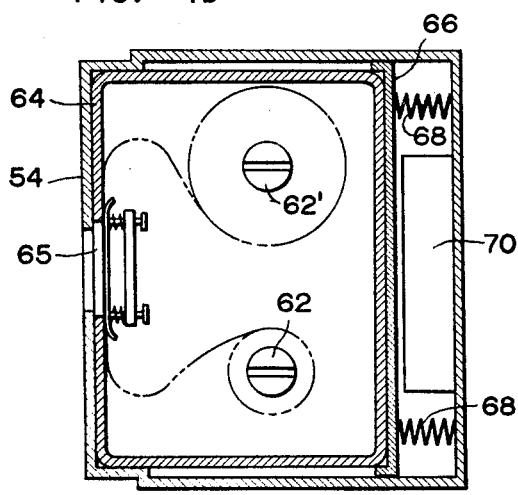

Referring now to FIG. 4a wherein like reference numerals have been employed to identify the corresponding components shown in FIGS. 2 and 3, there is illustrated one embodiment of the film loading unit of the invention suitable for use with a length of cinefilm loaded in a cartridge including therein a pressure plate. As in FIGS. 2 and 3, a film loading unit 40 includes a pair of taking-up shafts 62 and 62' adapted to engage the corresponding winding shafts (not shown) on a cartridge 64 just described when the latter is loaded into the loading unit 40.

In order to maintain the cartridge 64 in place within the film loading unit 40, the latter is provided with a push plate 66 (see FIG. 4b) resiliently disposed on the rear portion. The push plate 66 cooperates with spring means 68 disposed between the push plate and the rear wall of the loading unit to resiliently push the front surface of the cartridge having disposed thereon a film window 65, against the inner wall surface of the front wall 54 of the loading unit. A space designated by block 70 between the push plate 66 and the rear wall of the loading unit is provided for a footage meter of the conventional construction. Other parts are substantially the same as those shown in FIG. 2 or 3.

Figure 4C:
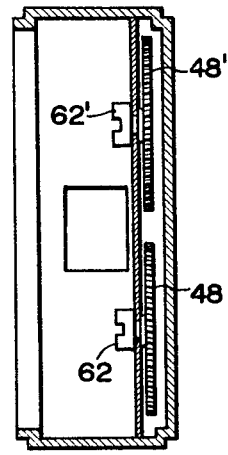
FIG. 4c is an elevational view, partly in cross-section, of the film loading unit illustrated in FIGS. 4a and b.
Figure 3B:
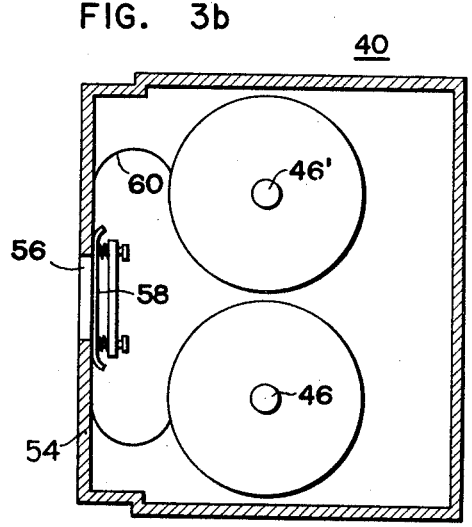
Figure 3C:
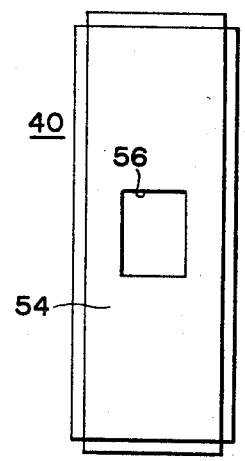
FIG. 3c is a front end view of the film loading unit as viewed from the rear of a photographic objective.
Figure 5:
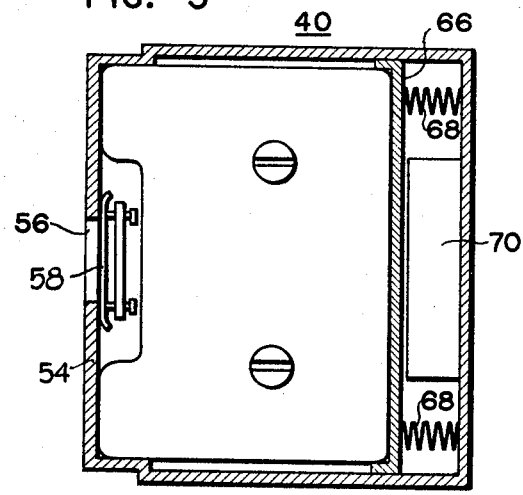
FIG. 5 is a cross-sectional view, partly in elevation of a film loading unit for use with a length of cinefilm loaded into a cartridge without a pressure plate.
Figure 3D:
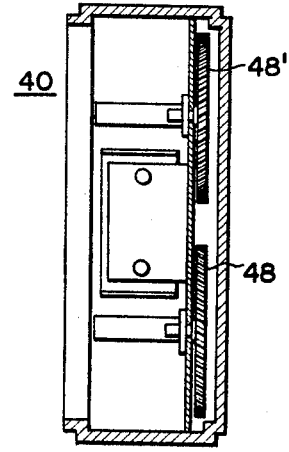
FIG. 3d is a sectional view, partly in elevation of the film loading unit taken on a surface substantially parallel to the surface of the cinefilm loaded in the same.

Referring now to FIG. 5 wherein like reference numerals designate the corresponding components illustrated in the previous figures, there is shown a modification of the invention suitable for use with a length of cinefilm loaded in a cartridge including no pressure plate. An arrangement illustrated is substantially identical to that shown in FIG. 4 except for a pressure plate 58 being disposed on the internal wall surface of the front wall 54 of the loading unit in the conventional manner.

If a cartridge including no pressure plate is used with the film loading unit according to the teaching of the invention then the latter is required to be provided with a pressure plate. Such a cartridge has a recess formed on the front face and that portion of the cinefilm passing through the recess is fully exposed externally of the cartridge. Therefore, the present loading unit for use with a cartridge including no pressure plate can be provided with the opening 56 substantially the same in dimension as that on the loading unit for use with a roll type of cinefilm and sufficient to have the aperture plate 18 snugly fitted thereinto. Conveniently the aperture plate may have its dimension corresponding to that of a film window 65 on a selected one of cartridges including a pressure plate and then the opening 56 on the film loading unit will be determined in accordance with the aperture plate thus determined.

A cartridge for the single width 8 mm. cinefilm has an opening 56 of less width than that for the double width cinefilm. To selectively use such cartridge type cinefilm, aperture plates as illustrated in FIGS. 6a and b may be selectively attached to the associated main body as by screws. FIG. 6a shows a wider aperture plate suitable for use with the double width type while FIG. 6b a narrower aperture plate suitable for use with the single width type.

Also there may be available cartridges of the type having a film opening or window longer in the direction of movement of the film than other types. With such cartridges, the aperture plate 18 may be divided into three parts, a central stationary portion 72, and an upper and lower portions 74 and 76 as shown in FIG. 7. The upper and lower aperture plate portions 74 and 76 are disposed for movement in the direction of the optical axis of the camera by the action of respective helical springs 78 and 80. If a cartridge having a long opening is used, all the aperture plate portions 72, 74 and 76 can be snugly fitted into the opening on the cartridge as shown in FIG. 7a. However, if a cartridge having a short opening is used, only the central portion 72 is snugly fitted into the opening of the cartridge while the upper and lower portions 74 and 76 are retracted into the opening on the main body to be approximately flush with the outer wall surface thereof by having the loading unit or the cartridge pushing the same against the action of the springs. While the two movable portions of the aperture plate are shown it will be understood that one or more than two of the movable portions may be used, if desired.

Also there may be selectively used 8 mm. cinefilms having different rates of feed, for example, because of a different pitch of perforations on the film or the positions thereof. According to the teachings of the invention, a plurality of feed claws used with the conventional mechanism for intermittently feeding a cinefilm can be provided and selectively operated in accordance with the type of cinefilm involved. At the same time a plurality of cam members of the conventional construction different in configuration of camming surface are operatively coupled to the respective feed claws in order to successively feed the proper length of the cinefilm involved. One embodiment is illustrated in FIGS. 8a and 8b. As shown in FIG. 8a the film loading unit 40 is provided on the front wall with a control projection or pin 82 disposed in a position dependent upon the type of cinefilm involved. On the other hand, the main body 10 is provided on the mating surface with holes 84 (see FIG. 8a) and a plurality of feed claws 86 of the conventional design, in this case two claws (see FIG. 8b) are disposed on the conventional mechanism for intermittently feeding the cinefilm. Each feed claw 86 is operatively coupled to one cam member 87 of the conventional design suitable for use with the particular cinefilm involved.

Upon operatively coupling the film loading unit to the main body, the pin 82 is inserted into a selected one of the holes 84 and projects beyond that surface of the main body having the aperture plate attached thereon. In the illustrated example, the pin 82 projects from the upper hole 84. As shown in FIG. 8b, one push member 88 suitably secured to the main body by a resilient member 90 is disposed adjacent each claw 86. The pin 82 projecting through the hole 84 forces the upper push member 88 from its position illustrated at dot-and-dash line to its position illustrated in solid lines. This causes the upper claw 86 to move out of the range of the film passage with the result that the upper claw is ineffective for intermittently feeding the cinefilm. Thus the lower claw cooperates with the associated cam member to successively and intermittently engage the perforations to intermittently feed the cinefilm at the desired feed amount in the conventional manner. If the pin 82 engages the lower hole 84 the upper claw 86 cooperating with the associated cam member 87 is effective for intermittent feed of the cinefilm. Other components illustrated in FIG. 8b are of the conventional design and need not be described.

It will be understood that lateral guide means for maintaining the widthwise position of the cinefilm can be disposed in their positions dependent upon the width of the cinefilm involved on the side of the associated film loading unit. This measure eliminates the necessity of exchanging the lateral guides for the particular cinefilm.

From the foregoing, it will be appreciated that the objects of the invention have been accomplished by the use of a plurality of aperture plates different in size and of a plurality of film loading units having different openings corresponding in dimension to the aperture plates respectively. Also the invetion provides an improved mechanism simple in construction to change the amount of film fed.

While the invention has been illustrated and described in conjunction with certain preferred embodiments thereof it is to be understood that various changes in the details of construction and the arrangement and combination of parts may be resorted to without departing from the spirit and scope of the invention.

What we claim is:

1. A small-sized cinematographic camera device comprising a single main body including the essential mechanisms for operating the device; a plurality of film loading units for loading therein lengths of cinefilm different in both frame size and available form respectively, said plurality of film loading units being capable of being selectively and detachably connected to said single main body and each of said units including a film taking-up mechanism; a plurality of aperture plates, one for each film loading unit, capable of being selectively and detachably connected on that surface of said single main body coupled to the associated film loading unit so as to project beyond that surface, said aperture plates having different configurations and outside dimensions; and each of the film loading units having on the front wall at which the film loading unit contacts the main body a corresponding opening for engagement with the associated aperture plate to insure the proper connection of a film loading unit and the associated aperture plate.

2. A small-sized cinematographic camera as claimed in claim 1, wherein each of said film loading units has on the front wall a projection, and said single main body includes an intermittent feed mechanism comprising a plurality of feed claws and a plurality of associated feed claws shifting members and has on the rear wall contacting the film loading unit a plurality of holes, said holes being adjacent said feed claw shifting members, the projection on a film loading unit extending into one of said holes dependent upon the position of perforations relative to the frames on the cinefilm therein to move the feed claw associated with said one hole into its inoperative position when the film loading unit is mounted on said main body.

References Cited

UNITED STATES PATENTS

| 2,008,110 | 7/1935  | Scheibell  | 352—72 X  |
| 2,061,879 | 11/1936 | Paillard   | 352—80    |
| 2,186,443 | 1/1940  | Becker et al. | 352—80 |
| 2,241,231 | 5/1941  | Wittel     | 352—72    |
| 2,326,980 | 8/1943  | Steiner    | 352—72    |
| 2,601,181 | 6/1952  | Thevenaz   | 352—59 X  |

FOREIGN PATENTS

| 854,768 | 1/1940 | France. |
| 565,169 | 7/1957 | Italy.  |

NORTON ANSHER, *Primary Examiner.*

M. H. HAYES, *Assistant Examiner.*